(12) United States Patent
Gupta et al.

(10) Patent No.: US 12,014,191 B2
(45) Date of Patent: Jun. 18, 2024

(54) USING PERSISTENT FINITE STATE MACHINE TO COORDINATE LIFECYCLE OPERATIONS IN SERVICE BROKER

(71) Applicant: SAP SE, Walldorf (DE)

(72) Inventors: Abhik Gupta, Bangalore (IN); Shivansh Rai, Sagar (IN); Vineet Singh, Mumbai (IN)

(73) Assignee: SAP SE, Walldorf (DE)

( * ) Notice: Subject to any disclaimer, the term of this patent is extended or adjusted under 35 U.S.C. 154(b) by 424 days.

(21) Appl. No.: 17/460,890

(22) Filed: Aug. 30, 2021

(65) Prior Publication Data
US 2023/0065589 A1 Mar. 2, 2023

(51) Int. Cl.
*G06F 9/448* (2018.01)
*G06F 9/46* (2006.01)
*G06F 16/23* (2019.01)
*H04L 67/02* (2022.01)
*H04L 67/562* (2022.01)

(52) U.S. Cl.
CPC ............ *G06F 9/4498* (2018.02); *G06F 9/466* (2013.01); *G06F 16/2379* (2019.01); *H04L 67/02* (2013.01); *H04L 67/562* (2022.05)

(58) Field of Classification Search
CPC .... G06F 9/4498; G06F 9/466; G06F 16/2379; G06F 8/36; G06F 9/541; G06F 9/547; H04L 67/02; H04L 67/562
See application file for complete search history.

(56) References Cited

U.S. PATENT DOCUMENTS

| | | | |
|---|---|---|---|
| 8,560,887 B2 * | 10/2013 | Behrendt | G06F 11/203 714/21 |
| 2007/0130305 A1 * | 6/2007 | Piper | G06F 9/5077 709/223 |
| 2019/0166209 A1 * | 5/2019 | Mueller | H04L 67/562 |

* cited by examiner

*Primary Examiner* — Jorge A Chu Joy-Davila
(74) *Attorney, Agent, or Firm* — Buckley, Maschoff & Talwalkar LLC

(57) ABSTRACT

Methods and systems may be associated with an Open Service Broker ("OSB") Application Programming Interface ("API") computing environment. A persistent finite state machine may be associated with an OSB API service broker, and a database may store a current state of the service broker. A computer processor of a state machine executor may retrieve the current state of the service broker from the database, and (based on the current state) use the persistent finite state machine to coordinate a distributed transaction workflow for the service broker, the distributed transaction workflow including asynchronous instance OSB API lifecycle operations that span multiple entities. The state machine may then update the database with state outputs for the service broker.

20 Claims, 15 Drawing Sheets

USING PERSISTENT FINITE STATE MACHINE TO COORDINATE LIFECYCLE OPERATIONS IN SERVICE BROKER

BACKGROUND

An enterprise may utilize a cloud computing environment that runs virtual machines to let users perform tasks. For example, the enterprise might let various clients or users execute Software-as-a-Service ("SaaS") applications or functions in the cloud computing environment to process purchase orders, adjust human resources information, generate invoices, etc. It can, however, be difficult for independent software vendors to create and maintain applications across various platforms and/or multi-cloud computing environments. In response to this situation, the Open Service Broker ("OSB") Application Programming Interface ("API") was developed to let independent software vendors, SaaS providers, and developers more easily provide backing services to workloads running on cloud native platforms such as CLOUD FOUNDRY® and KUBERNETES®. The protocol, which has been adopted by many platforms and service providers, describes a set of API endpoints that can be used to provision, access, and manage service offerings.

As used herein, the phrase "service broker" may refer to interactions that manage the lifecycle of services. The OSB API defines these interactions (as a result, software providers can offer services to anyone, regardless of the technology or infrastructure those software providers use). Each service broker that complies with the OSB API specification has the same set of lifecycle commands, such as commands to fetch a catalog of backing services that a service broker offers, provision new service instances, connect and disconnect, deprovision service instances, etc.

FIG. 1 illustrates an OSB API system 100. A service catalog 110 may access services 120 and receive a request from a client. Via the OSB API, a service broker 130 may provision and manage a service instance 140 and bind the service instance 140 to an application 150. Note that a service can, in some cases, be associated with a series of functions 160 (e.g., functions FA, FB, and Fc)., where function FA calls function FB which, in turn, calls function Fc. The service broker 130 manages the life cycle of services 120, and platforms can interact with the service broker 130 to provision, access, and manage the services 120. The service catalog 110 describes all of the services that can be provisioned through the service broker 130. The service instance 140 is a provisioned instance of a service 120 as described in the service catalog 110. Once the service instance 140 is provisioned, the application 150 can begin to communicate with that instance 140. From the perspective of the service broker 130, this is called a "service binding." Deprovisioning the service instance 140 deletes all the resources created upon the initial provisioning of the service instance 140. With a unified approach as defined by the OSB API, applications can be developed and associated with any number of provisioned middleware and routing software without worrying about the underlying infrastructure (because it is all abstracted by the service broker 130).

It would therefore be desirable to facilitate creation of OSB API-compliant functions for a computing environment in a secure, automatic, and efficient manner.

SUMMARY

According to some embodiments, methods and systems may be associated with an Open Service Broker ("OSB") Application Programming Interface ("API") computing environment. A persistent finite state machine may be associated with an OSB API service broker, and a database may store a current state of the service broker. A computer processor of a state machine executor may retrieve the current state of the service broker from the database, and (based on the current state) use the persistent finite state machine to coordinate a distributed transaction workflow for the service broker, the distributed transaction workflow including asynchronous instance OSB API lifecycle operations that span multiple entities. The state machine may then update the database with state outputs for the service broker.

Some embodiments comprise: means for retrieving, by a computer processor of a state machine executor, a current state of an OSB API service broker from a database; based on the current state, means for using a persistent finite state machine to coordinate a distributed transaction workflow for the service broker, the distributed transaction workflow including asynchronous instance OSB API lifecycle operations that span multiple entities; and means for updating the database with state outputs for the service broker.

Some technical advantages of some embodiments disclosed herein are improved systems and methods to facilitate creation of OSB API-compliant functions for a computing environment in a secure, automatic, and efficient manner.

DETAILED DESCRIPTION

Figure 1:
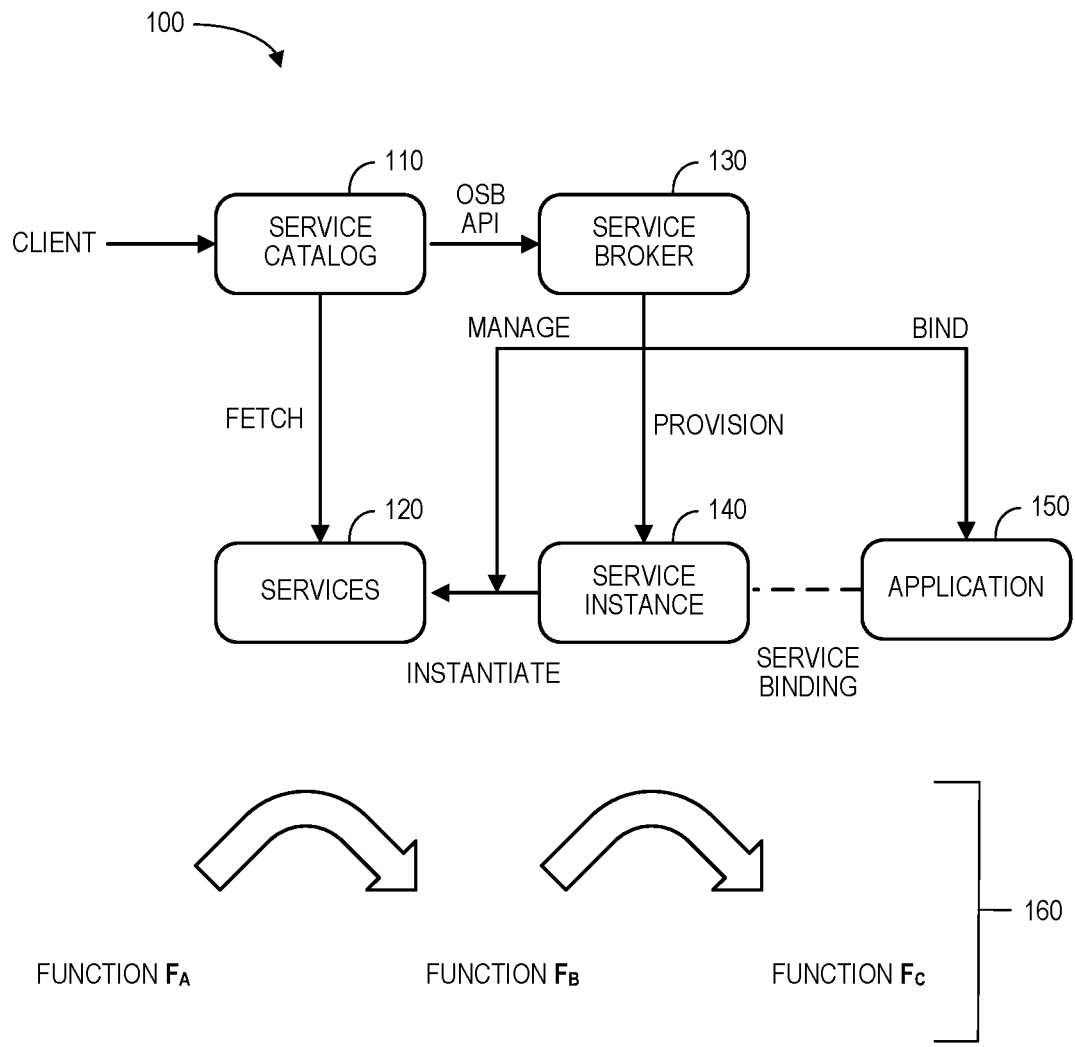
FIG. 1 illustrates an OSB API system.

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The Open Service Broker ("OSB") Application Programming Interface ("API") provides a specification for product vendors and developers to uniformly provide services to application workloads running on cloud application platforms such as CLOUD FOUNDRY® and KUBERNETES®. The specification has been adopted and used by service providers to provision, manage, and gain uniform access to managed service offerings. The API specification allows for both synchronous and asynchronous/long-running lifecycle operations against instances by leveraging semantics of HTTP status codes and payloads. Asynchronous instance lifecycle operations usually consist of a multi-step sequence of distinct business transactions spanning multiple entities such as cloud provider networks and databases. These transactions might be interleaved with each other and may require rollbacks to maintain operational consistency. Long-running business transactions in the context of lifecycle operations require coordination using compensating workflows and need to be carefully orchestrated to satisfy data consistency.

Some embodiments described herein may help coordinate complex distributed transaction workflows within the context of OSB-compliant APIs using the characteristics of a classic Finite State Machine ("FSM") along with a practical implementation model with persistence. As used herein, the phrase FSM (also known as a finite-state automaton, finite automaton, or simply a state machine) may refer to a mathematical model of computation. SA FSM is an abstract machine that can be in exactly one of a finite number of states at any given time. The FSM can change from one state to another in response to inputs, and the change from one state to another is called a "transition." Moreover, some embodiments may be associated with an adoption of the state machine model in a typical service broker deployment may provide real-world benefits such as reproducibility, consistency, operational atomicity, error-handling, reduction in implementation complexity, etc.

A service broker may supervise and orchestrate the lifecycle of services including provisioning, update, de-provisioning, and credential management of instances of the service offering. Platform users interact with the service broker to provision, manage, and access service instances of the offering published by the broker. The rules of standardization provided by the OSB API specification help software vendors to offer their services to application users, independent of the technology or infrastructure the vendors utilize.

Figure 2:
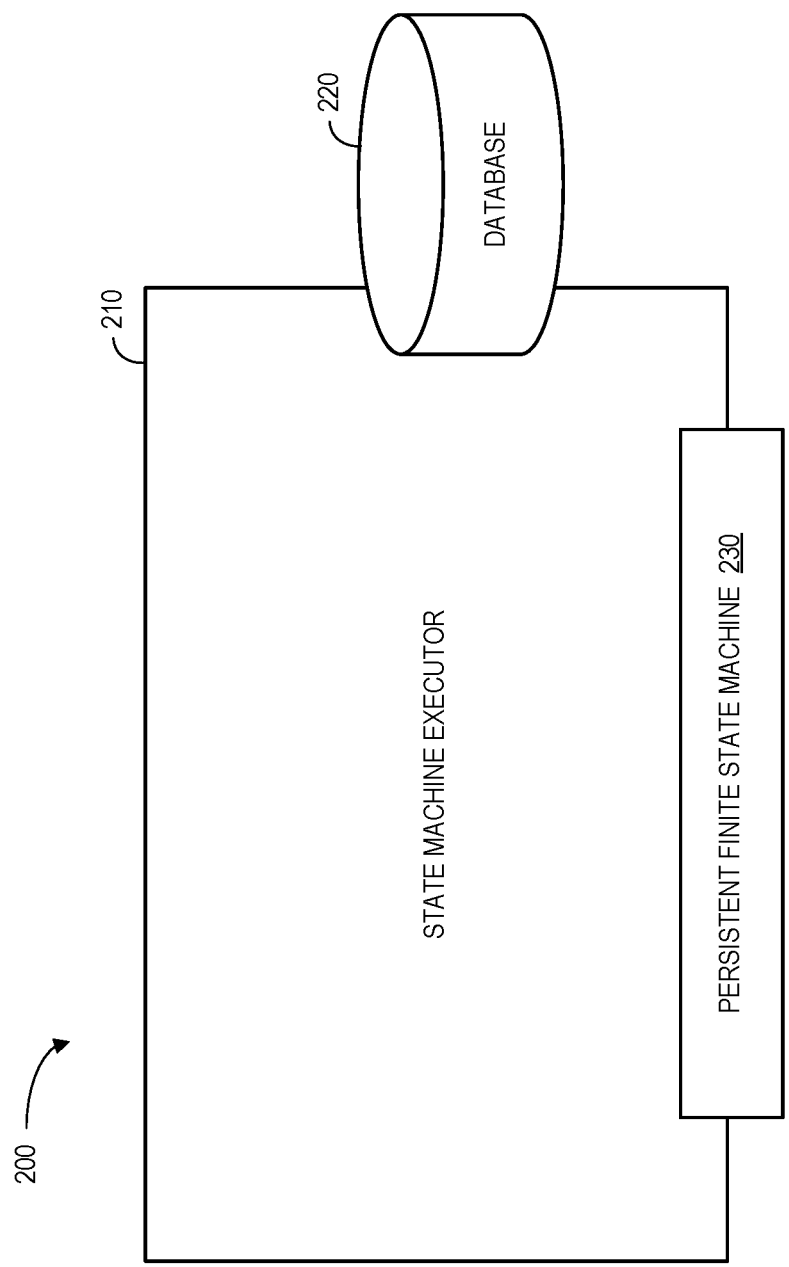
FIG. 2 is a high-level block diagram of a system in accordance with some embodiments.

FIG. 2 is a high-level block diagram of a system 200 in accordance with some embodiments. The system 200 includes a state machine executor 210, a database, and a persistent FSM 230. According to some embodiments, the state machine executor 210 may, based on a current state in the database 220, use the persistent FSM 230 to automatically coordinate a distributed transaction workflow for a service broker (the distributed transaction workflow may, for example, include asynchronous instance OSB API lifecycle operations that span multiple entities). As used herein, the term "automatically" may refer to, for example, actions that can be performed with little or no human intervention.

As used herein, devices, including those associated with the system 200 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The state machine executor 210 may store information into and/or retrieve information from various data stores (e.g., the database 220), which may be locally stored or reside remote from the state machine executor 210. Although a single state machine executor 210 and database 220 are shown in FIG. 2, any number of such devices may be included. Moreover, various devices described herein might be combined according to embodiments of the present invention. For example, in some embodiments, the state machine executor 210 and the database 220 might comprise a single apparatus. The system 200 functions may be performed by a constellation of networked apparatuses, such as in a distributed processing or cloud-based architecture.

An operator or administrator may access the system 200 via a remote device (e.g., a Personal Computer ("PC"), tablet, or smartphone) to view information about and/or manage operational information in accordance with any of the embodiments described herein. In some cases, an interactive graphical user interface display may let an operator or administrator define and/or adjust certain parameters (e.g., to define how systems interact) and/or provide or receive automatically generated recommendations or results from the system 200.

Figure 3:
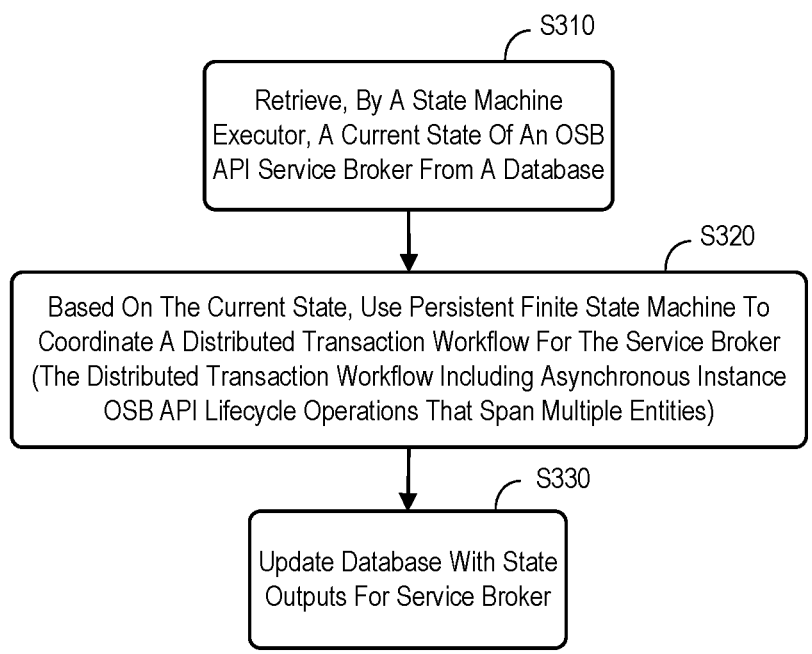
FIG. 3 is a method according to some embodiments.

FIG. 3 is a method that might performed by some or all of the elements of the system 200 described with respect to FIG. 2. The method may be associated with, for example, an OSB API computing environment such as a cloud infrastructure provider or an on-premises deployment. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S310, a computer processor of a state machine executor may retrieve a current state of an OSB API service broker from a database. The OSB API service broker may, for example, be used to provision, manage, and/or access service instances of a service offering in a computing environment (e.g., a cloud infrastructure provider or an on-premises deployment). Based on the current state, at S320 a persistent FSM may be used to coordinate a distributed transaction workflow for the service broker. According to some embodiments, the distributed transaction workflow includes asynchronous instance OSB API lifecycle operations that span multiple entities (e.g., a cloud provider network, persistent storage, etc.).

The persistent FSM may span HTTP boundaries and provide scalability, support for serial and parallel task workflows, support for conditional units of execution, distributed transaction support, language-agnostic representation of states and transitions, persistence, fault tolerance, etc. According to some embodiments, the persistent FSM defines a data model including state machine executions fields and state machine master fields (as described in connection with FIG. 8). At S330, the system may update the database with state outputs for the service broker.

Because the OSB API specification is built using the tenets of Representational State Transfer ("REST") API protocol standards, service brokers may adhere to Hyper-Text Transfer Protocol ("HTTP") semantics. Instance lifecycle operations usually include distinct multi-step transactions that could span various systems including databases, cloud networks, and/or disparate APIs. Coordination of multiple steps in the context of HTTP request-response communication and adherence to the OSB API guidelines are usually non-trivial and depend largely on the semantics of the service offering.

A classic FSM may be used in the modelling and design of computing systems involving multiple distinct states and workflows. A classic FSM is formally a computational quintuple ($\epsilon$, $\zeta s0$, $\rho$, F), where E denotes the input alphabet (a finite non-empty set of inputs), $\zeta$ is a finite non-empty set of states, s0 is an initial state (and an element of $\zeta$), $\rho$ is the state-transition function, and F is the set of final states. A classic FSM performs a pre-determined sequence of activities based on inputs and may be treated as a deterministic system if the set of states is expanded to include a set of "accepted" states. This presents a well-defined, locked-down version of a state machine.

Due to the inherently stateless nature of the HTTP protocol and the OSB API specification, inculcating a FSM (especially one with a large set of states) into a lifecycle operation is often subject to real-world issues such as timeouts, operational complexity, inconsistency, etc. Furthermore, a classic FSM does not deal with transactional rollbacks in its computational model. Bringing forth the concepts of transactions into the implementation of a semantic HTTP server adds additional complexity to service brokers.

With these conditions, a classic FSM and simplified transactional model cannot meet the requirements of the design of service brokers which need to interact with distinct systems and APIs. Therefore, notions of distributed transactions and persistence may be inculcated into classic FSMs and implemented in service brokers to achieve operational consistency and atomicity. Some characteristics and implementation of this "special FSM" in the context of service broker applications will now be described.

There are several frameworks and libraries which exist in various programming languages that provide implementation of custom state machines. However, these frameworks typically do not consider the nuances of distributed systems and have limitations related to scalability, fault-tolerance, and limited support for execution workflows. The design of a FSM that spans the boundaries of HTTP requests and several systems may consider the following points:

1. Scalability—The performance characteristic of the FSM may support horizontal scaling of the application processes which embed the FSM. The state machine must work reliably if compute resources of the application are scaled horizontally or vertically.

2. Support for serial and parallel task workflows—The FSM may support both serial and parallel executions where the workflows might compose a multi-step execution engine. While a singular task may represent a unit of work, a set of tasks may be executed concurrently or serially or in a mixed manner to compose a workflow defining an operation.

Figure 4:
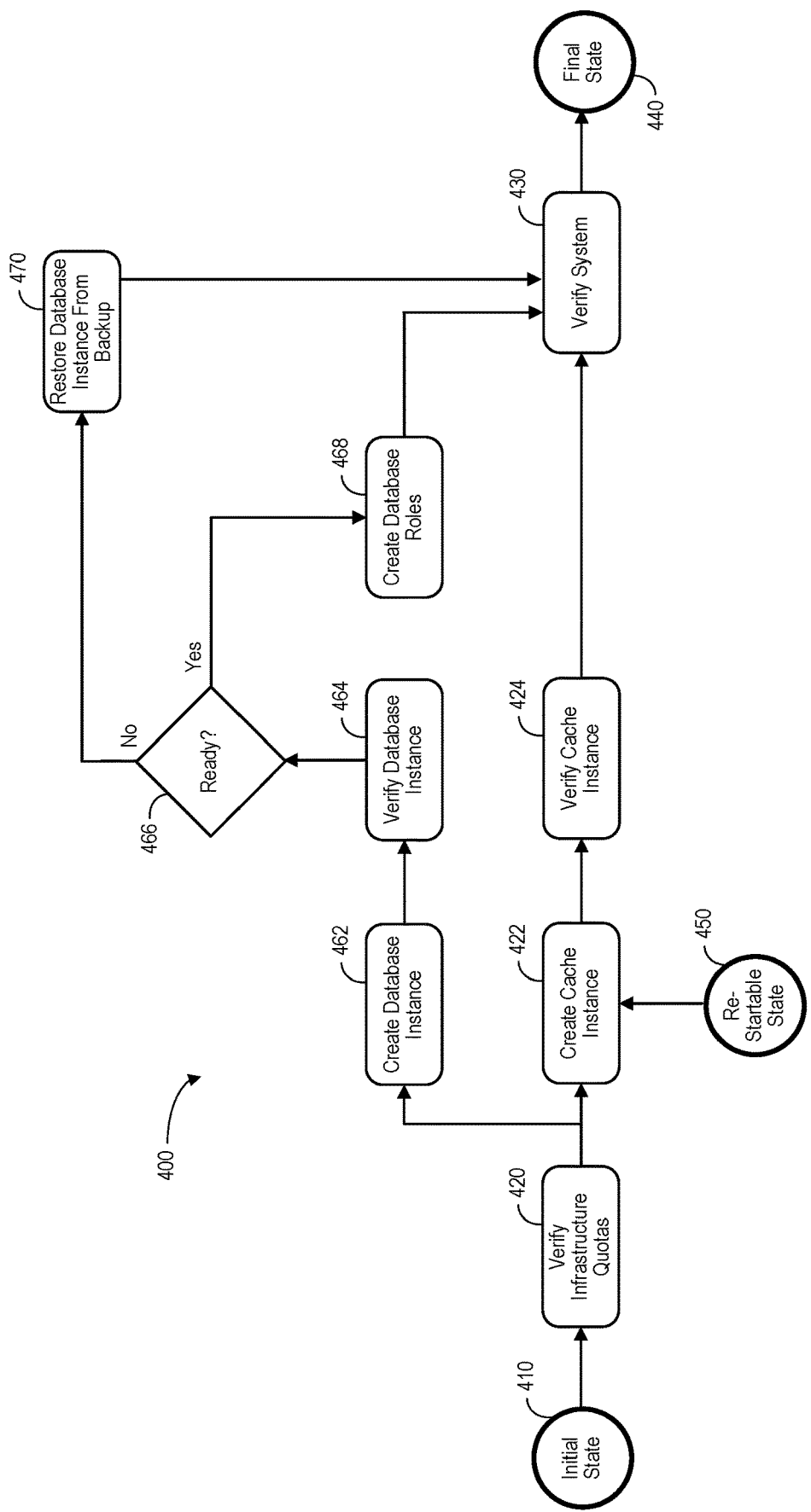
FIG. 4 shows a state machine with serial and parallel executions in accordance with some embodiments.

3. Support for conditional units of execution—The FSM may support conditional executions of sections of workflows within it. An example of a state machine 400 composed of serial and parallel executions with optional tasks is depicted in FIG. 4. Starting at an initial state 410, the system may verify infrastructure quotas 420 (representing a "state transition" that places the system in an "intermediate" state), create a cache instance 422, verify the cache instance 424, and finally verify the system 430 before reaching final state 440. Note that a re-startable state 450 may begin by creating the cache instance 422. After the infrastructure quotas are verified 420, the system may create a database instance 462 and verify the database instance 464 (in parallel with 422 and 424). If it is determined that the database instance is ready 466, the system may create database roles 468 before verifying the system 430. If it is determined that the database instance is not ready 466, the system may restore a database instance from backup 470 before verifying the system 430.

Figure 5:
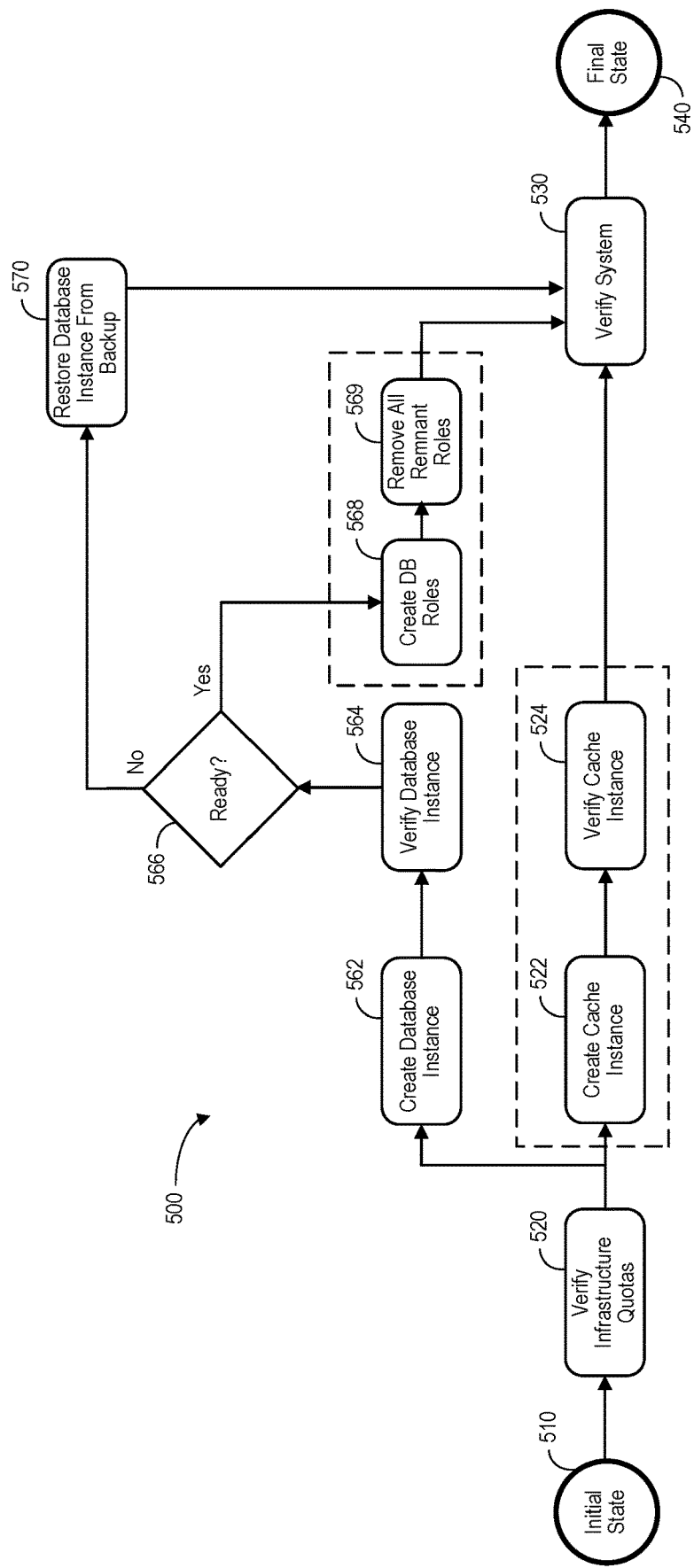
FIG. 5 shows a state machine with distributed transaction support according to some embodiments.

4. Distributed transaction support—The multi-behavior finite state machine must support the inherent properties of operational atomicity and consistency of distributed transactions. The state machine must support executing compensating tasks corresponding to local transactional tasks and proceed to execute further steps if a two-phase commit is certified, i.e., the FSM must inherently support sagas. In addition, the FSM may optionally support re-tryable local transactional states. A modified view of the state machine 400 depicted in FIG. 4 with distributed transaction support is depicted 500 in FIG. 5. As before, the system may start at an initial state 510, the system may verify infrastructure quotas 520 (representing a "state transition" that places the system in an "intermediate" state), create a cache instance 522, verify the cache instance 524 (the creation of the cache instance 522 and the verification of the cache instance 524 together represent a "local transaction" without a compensating transaction), and finally verify the system 530 before reaching final state 540. After the infrastructure quotas are verified 520, the system may create a database instance 562 and verify the database instance 564 (in parallel with 522 and 524). If it is determined that the database instance is ready 566, the system may create database roles 568 and remove all remnant roles 569 (together representing a local compensating transaction) before verifying the system 530. If it is determined that the database instance is not ready 566, the system may restore a database instance from backup 570 before verifying the system 530.

5. Language-agnostic representation of states and transitions—The execution of the FSM's tasks and transitions may be represented using a semantic, structured language and not be tied to any specific programming language. In this regard, the AMAZON® States Language is a JavaScript Object Notation ("JSON")-based declarative language specification used to describe state machines. The AMAZON® States language covers the wide gamut of state machine semantics including resource states, transitions (using links), and conditional state transitions. According to some embodiments, a FSM implements the AMAZON® States language specification for declarative definition of the state transitions.

6. Persistence—The FSM may support deterministic retry and optional cancellation of state transitions as well as reporting of the overall state of the FSM. This may imply that the FSM supports storage of the in-memory representations of the transitions and states in a persistent data structure. The FSM can support both relational and non-relational data storage but may provide a unified data model covering the state machine concepts.

Figure 6:
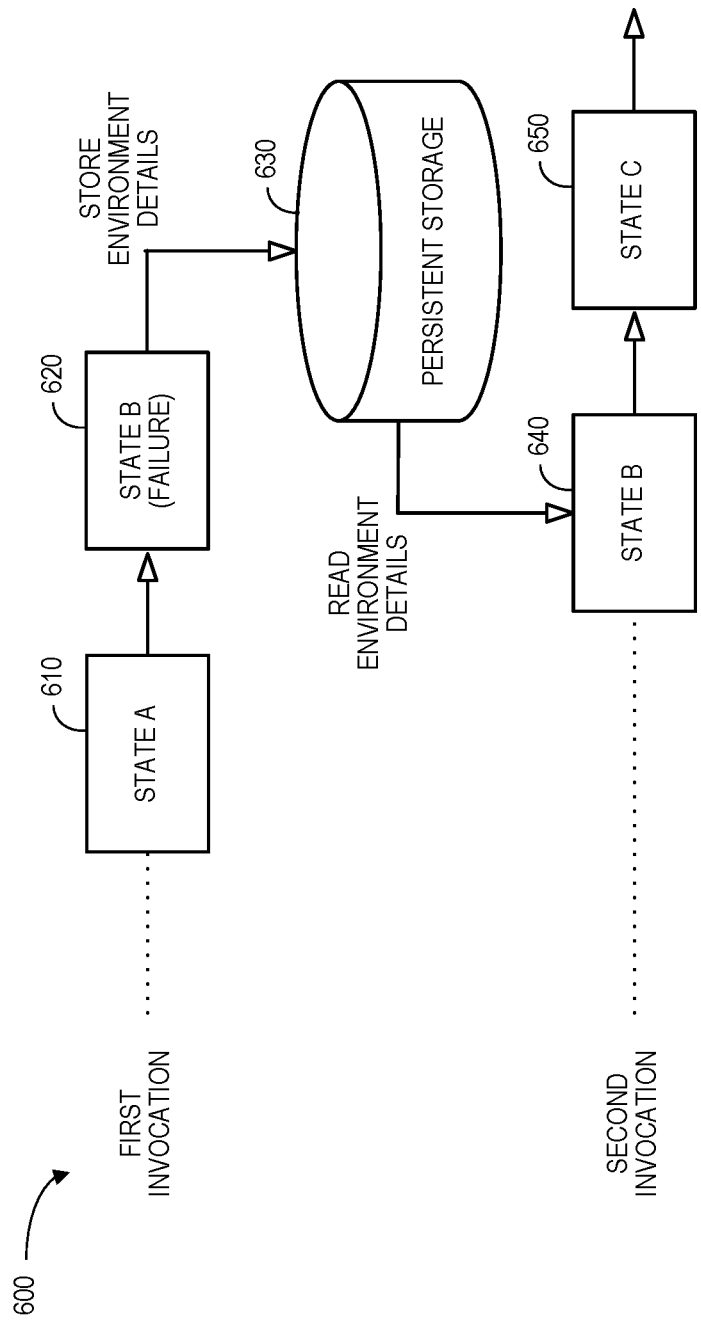
FIG. 6 is a fault-tolerant state machine using persistence in accordance with some embodiments.

7. Fault tolerance—When a failure is encountered while executing a state or a transition, the FSM can choose to tolerate the failure or execute compensable measures to recover from the failure. The machine may be flexible enough to support these fault handling measures. FIG. 6 is a fault-tolerant state machine 600 using persistence in accordance with some embodiments. A first invocation may be associated with a transfer from state A 610 to state B 620 which results in a failure. At that point, environment details may be store into persistent storage 630. A second invocation may be associated with reading the environment details from persistent storage 630 to re-establish state B 640 before transitioning to state C 650.

Figure 7:
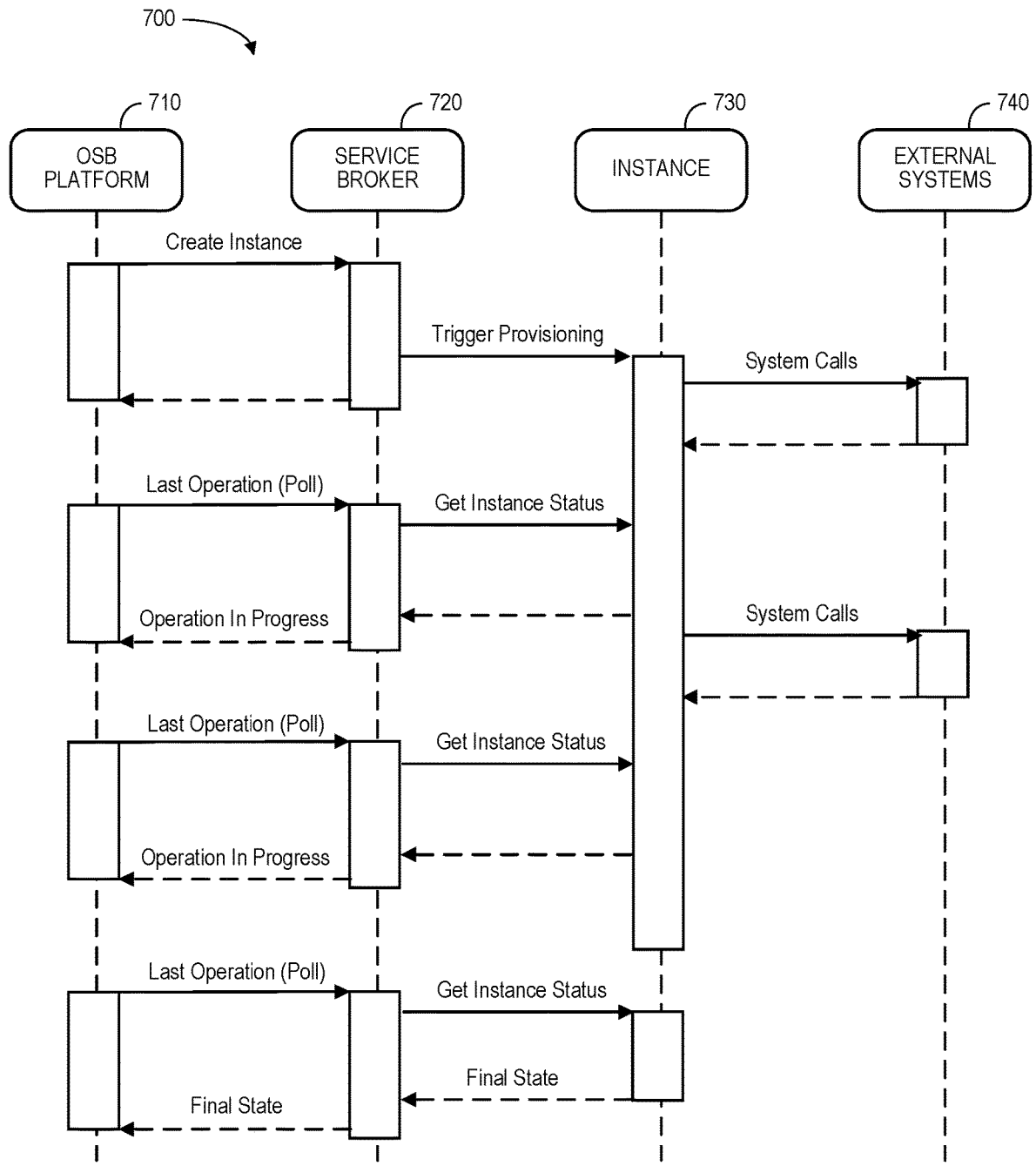
FIG. 7 is an asynchronous service broker operation timeline according to some embodiments.

An asynchronous workflow in service brokers represents a long-running operation usually spanning multiple transactional workflows. In the timespan covering an asynchronous operation, the service broker usually interacts with several systems (such as cloud provider APIs, databases, etc.) and may respond to the platform's requests for resource status. A typical asynchronous lifecycle operation timeline 700 coordinated by a service broker is depicted in FIG. 7. An OSB platform 710 may create an instance using a service broker 720. In turn, the service broker 720 may trigger provisioning to an instance 730 that executes service calls to external systems 740. Later, the OSB platform 710 may poll the last operation to the service broker 720 who gets instance status from the instance 730 (e.g., resulting in an "operation in progress" message from the service broker 720 to the OSB platform 710). This may be repeated until the instance 730 returns a final state to the service broker 720 which reports that to the OSB platform 710. It may be important for service brokers 720 to manage the execution of these long-running transactional workflows and report the operational status of the resources to the OSB platform 710. This means that the FSM may always maintain a singular status of the execution representing the long-running operation.

Figure 8:
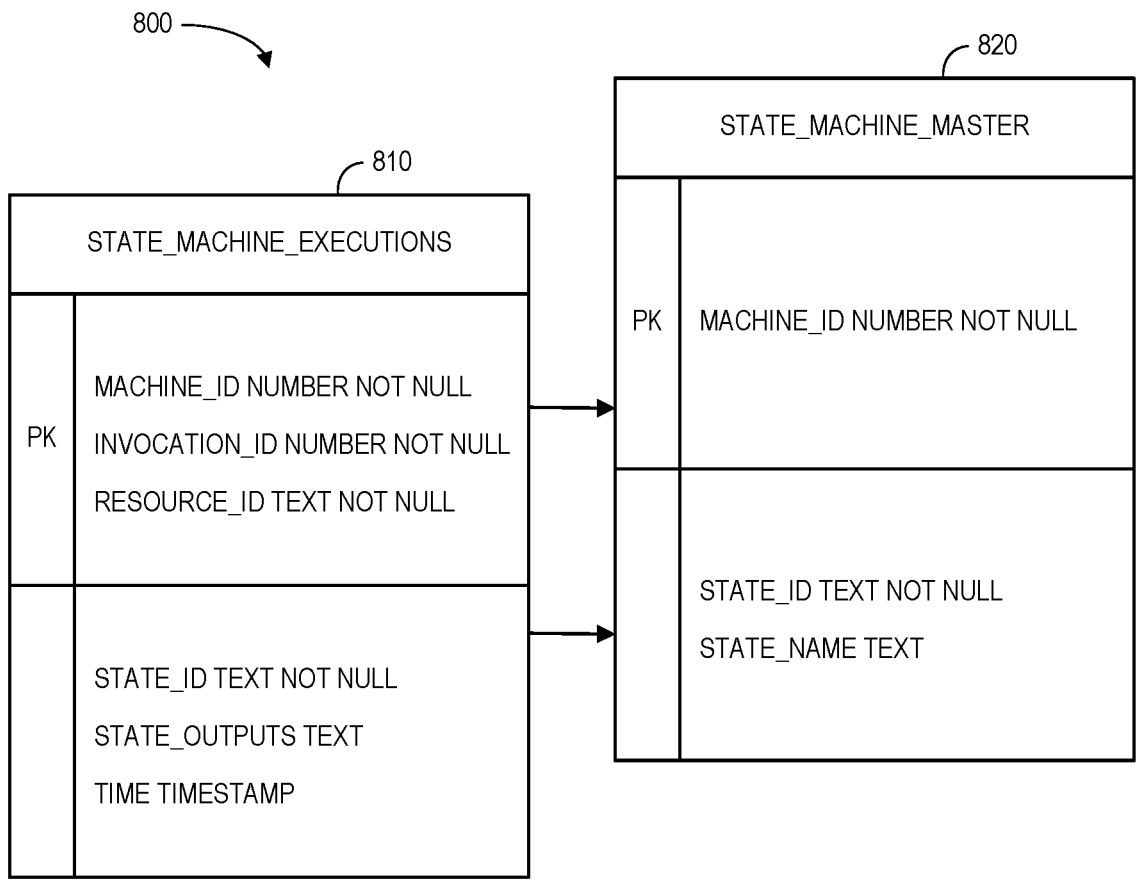
FIG. 8 is a data model for a FSM in accordance with some embodiments.

The FSM may define a generic data model that enables the retry-ability of states and depicts the status of each transition and the overall machine instance. An entity or data model 800 according to some embodiments is shown in FIG. 8. According to some embodiments, the data or entity model 800 is designed to be flexible enough to be implemented in relational and non-relational databases, including "STATE_MACHINE_EXECUTIONS" fields 810 and "STATE_MACHINE_MASTER" fields 820. The fields in the entity model 800 may include:

1) MACHINE ID: This represents an identifier for the state machine. Since a service broker might involve multiple FSMs in the course of its activity, the field assists in identifying a specific state machine instance.
2) STATE ID: This represents a unique identifier for a particular state. For example, a state representing creation of a database role may be represented by the text CREATE DB ROLE.
3) STATE NAME: This represents a human-readable name for a state.
4) INVOCATION ID: This represents a unique identifier to represent a specific invocation of the FSM instance.
5) RESOURCE ID: This represents the resource managed by the service broker. Service brokers may manage service instances and service bindings—therefore, the resource ID may represent a managed instance or a binding. The service broker is expected to map the resource ID to the instance/binding using any means as necessary—the state machine may treat this as an implementation detail of the broker.
6) STATE OUTPUTS: This represents the optional output of a state and may act as input to a state transition. State outputs may be represented in arbitrary data formats, although the FSM could narrow the format to a data format such as JSON or Yet Another Markup Language ("YAML") to simplify parsing.
7) TIME: This may represent the timestamp for the last operation on the state.

The data model 800 might not replicate the fields and constructs provided in the AMAZON® States Language specification document into the database. The machine may correlate and merge the fields defined in the static specification document and the execution states to provide the final status of the workflow.

The in-memory representation of the FSM can be depicted similarly to the computational representation of a classic state machine. The FSM may require a definition of an initial state—according to some embodiments, this may be represented as an intangible identifier or an output of another FSM. States may be represented as in-memory or remote function invocations which attempt to move the state machine forward. A remote function invocation might be implemented using remote system calls, API requests, serverless function invocations, etc. While the FSM might not aim to provide widespread support for all remote function systems, it could provide a plugin model for a group of commonly available functions. An execution of a state may be treated as an event leading to a change in the FSM.

A state may define a reset command which could be an in-memory or remote function. A reset command is expected to handle the rollback of the local transaction triggered by the state. State transitions may be represented as, for example, in-memory function invocations. The state transition function can take the output of a previous state as an input, mutate the storage (if required), and run arbitrary remote code as necessary.

Figure 9:
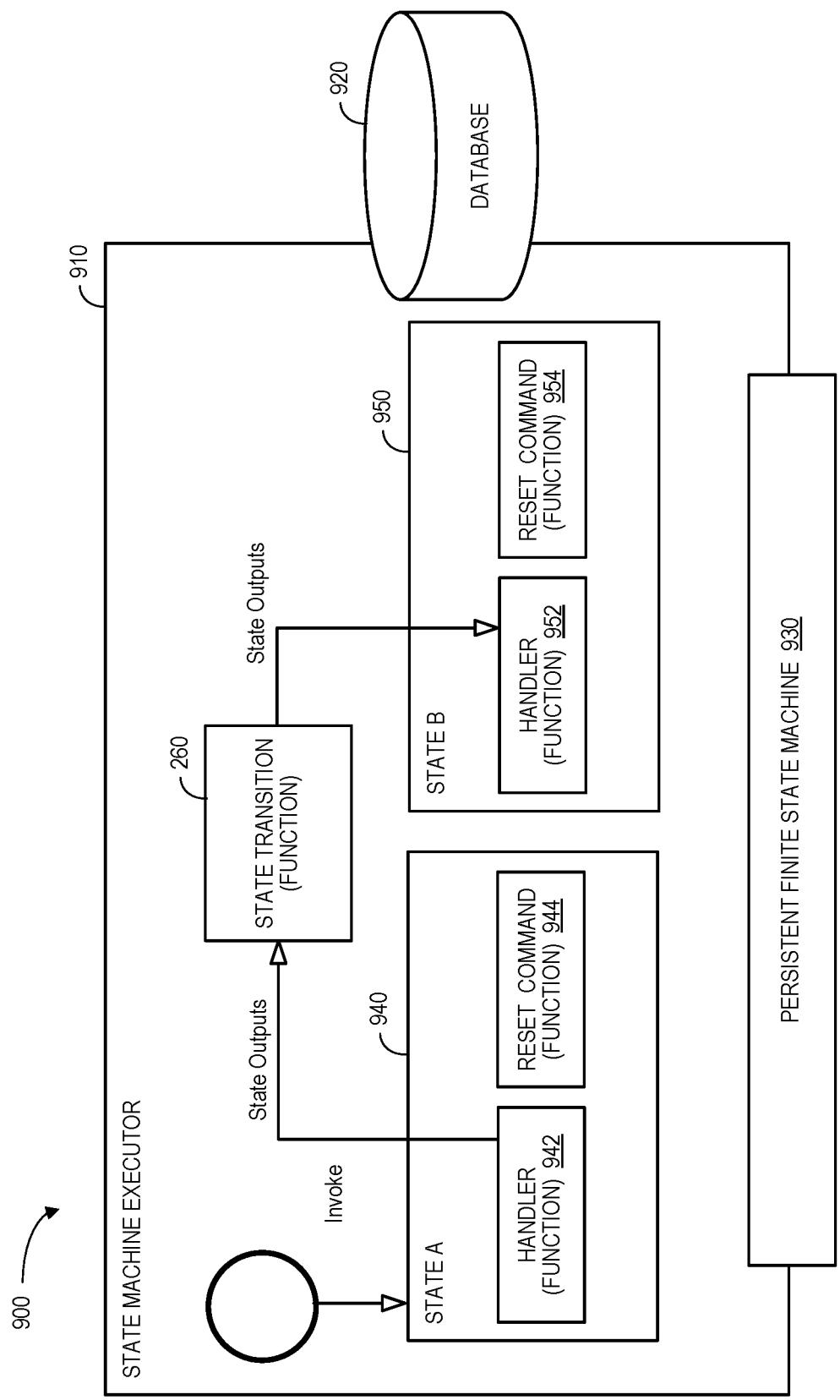
FIG. 9 is a memory model for a FSM according to some embodiments.

FIG. 9 is a memory model 900 for a FSM according to some embodiments. The memory model 900 includes a state machine executor 910 associated with a database 920 and a persistent FSM 930. Starting from an arbitrary initial state (e.g., START or IDLE), the system fetches the current state from the database 920 (entity storage) and executes the relevant transition 960 from state A 940 (associated with a handler (function) 942 and a reset command (function) 944) to state B 950 (associated with a handler (function) 952 and a reset command (function) 954) when an event is matched or triggered. However, since the service broker receives HTTP requests from the platform for asynchronous operations, the system must ensure that: (i) the orchestration is triggered on HTTP requests consistently, (ii) the associated function handlers are invoked, and (iii) the database 920 is updated with state outputs. Of course, the system must handle executing the function tasks in serial or parallel mode as defined in the AMAZON® States language specification document.

When a failure is encountered while running an executable state (and if a reset command is defined for the state), the command is invoked immediately after the failure is detected. Reset commands usually involve network and IO calls. The reset commands are invoked in the reverse sequence of the states and bubble up until the initial state is reached. In this way, the state machine ensures that service broker-managed resources are also efficiently cleaned up and handles operational consistency.

Figure 10:
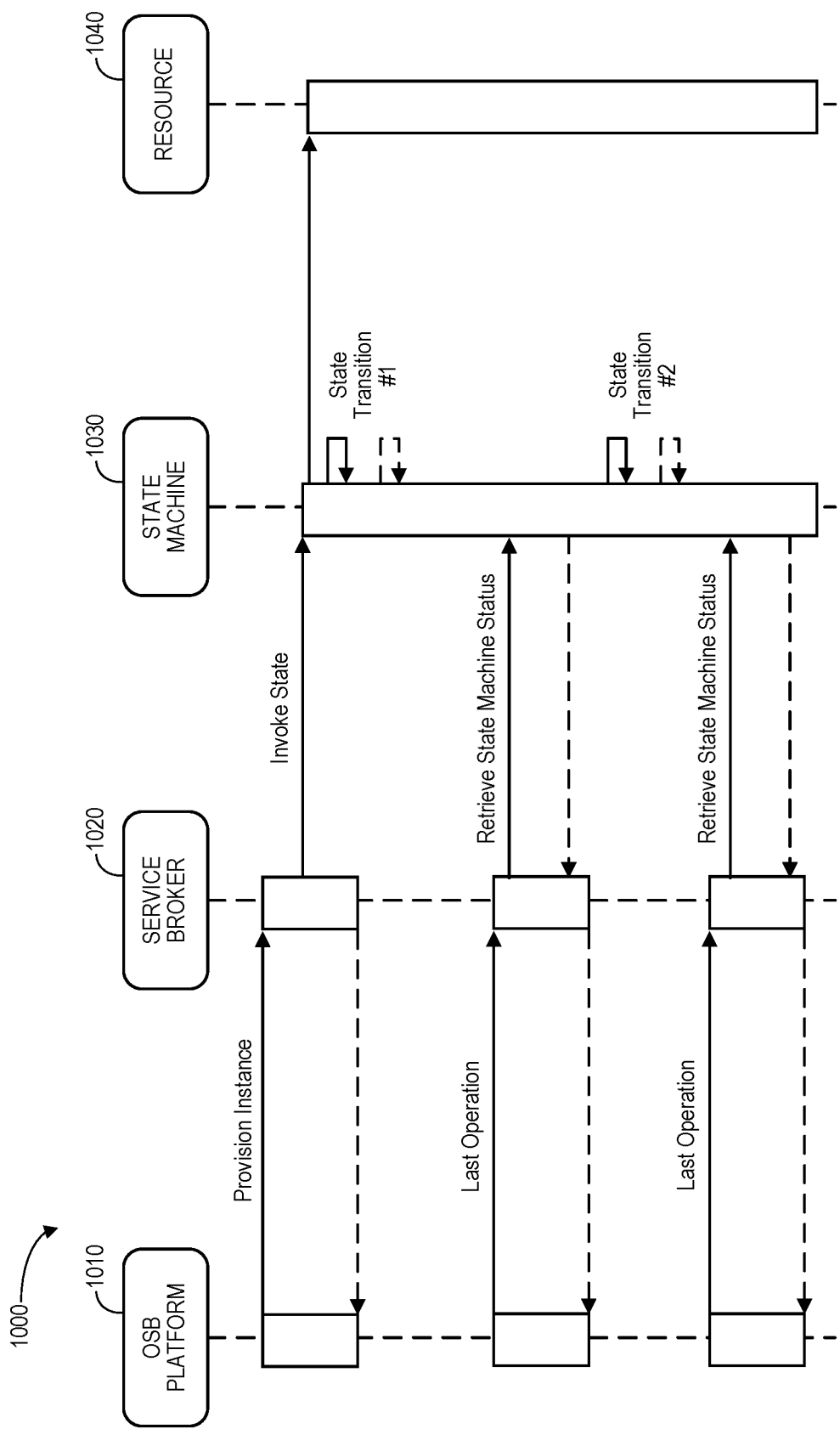
FIG. 10 is a timeline showing an asynchronous lifecycle operations in service brokers using a FSM in accordance with some embodiments.

FIG. 10 depicts a representative timeline 1000 diagram of a service broker-managed asynchronous lifecycle operation using the persistent finite state machine. An OSB platform 1010 may initiate provision an instance to a service broker 1020 resulting in a state being invoked to a state machine 1030. The state machine 1030 may then access a resource 1040 and execute state transition number 1. Subsequently, the OSB platform 1010 may send a last operation to the service broker 1020 causing the service broker 1020 to retrieve state machine status from the state machine 1030.

Figure 11:
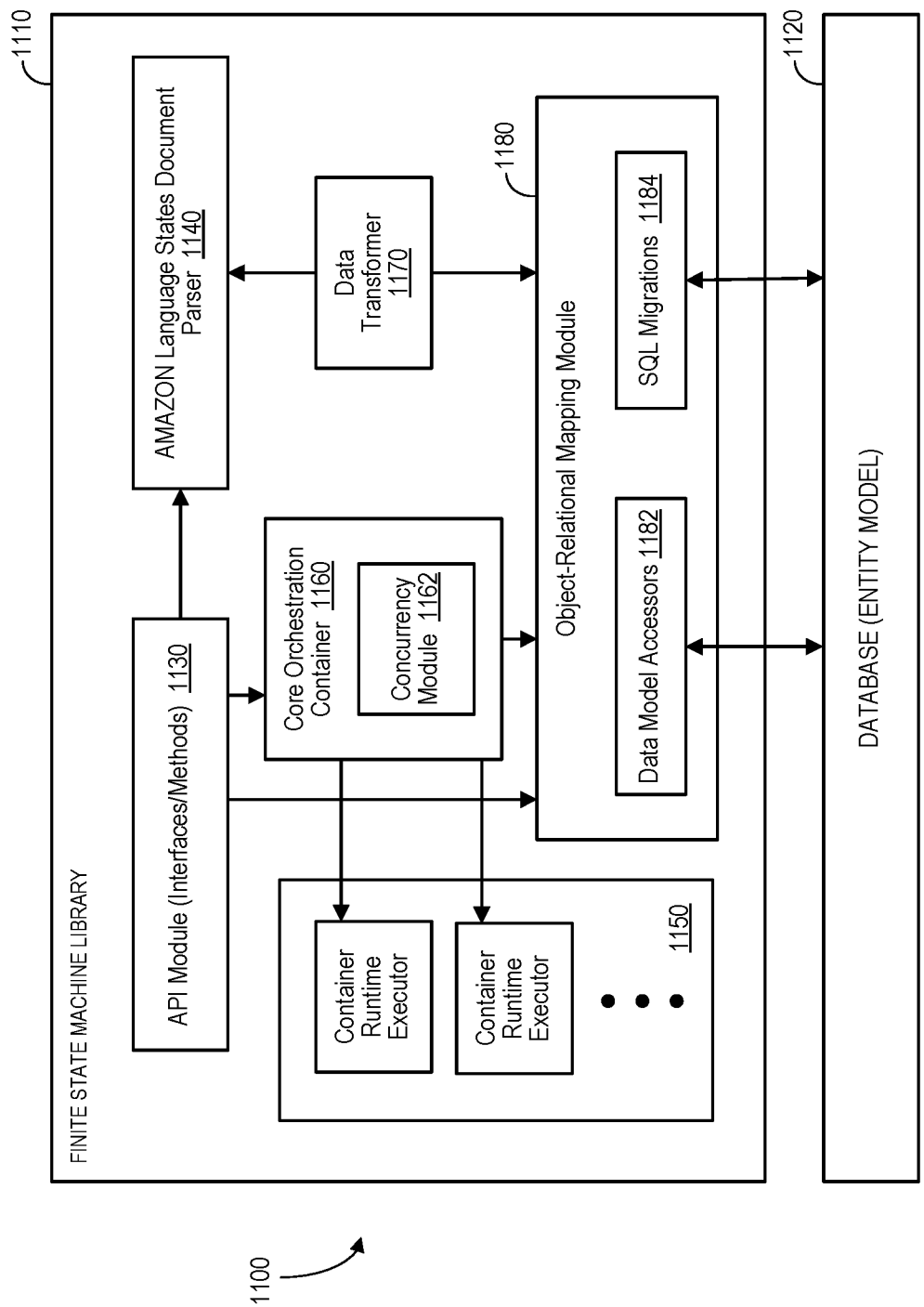
FIG. 11 shows interactive modules in a FSM library according to some embodiments.

According to some embodiments, the implementation of a FSM relies primarily on an FSM library. The library may encapsulate the logic for interacting with the database and invoking the state handlers. While the library may be called from the service broker runtime, according to some embodiments the library may be exposed as its own service API. FIG. 11 shows 1100 interactive modules in a FSM library 1110 according to some embodiments. The FSM library 1110 exchanges information with a database (entity model) 1120 and includes an API module (interfaces/methods) 1130 and an AMAZON® language states document parser 1140. The FSM library 1110 also includes container runtime executors 1150 (e.g., a plugin module for executors) and core orchestration container 1160 with a concurrency module 1162. A data transformer 1170 may act as an interface between the document parser 1140 and an object-relational mapping module 1180 (with data model accessors 1182 and Structured Query Language ("SQL") migrations 1184). The FSM library 1110 may: (i) embed the parser 1140 for JSON documents conforming to the AMAZON® States language specification, (ii) encapsulate logic for triggering serial and parallel executions of task functions as per the specification, (iii) interact with the database 1120 using transactions, and (iv) provides methods/APIs to retrieve execution states. Due to the reliance on the data model for persistence, some embodiments may use the object-relational mapping module 1180 to abstract the implementation specifics of data access.

Since the executions of serial and parallel workflows usually involve network calls, IO cycles, and CPU-dependent operations, some embodiments may run these tasks in their own process and network namespaces to reduce the burden on the service broker runtime. In this case, the FSM library 1110 may act as a delegation system to process control runtimes (e.g., container runtimes or serverless runtimes). The FSM library 1110 may also provide a plugin system to manage the delegation model and support in-memory executions of tasks. At its core, the FSM library 1110 may implement an orchestration-oriented saga controller, i.e., it may act as a centralized controller which orchestrates saga local transactions and coordinates the operations on participating systems based on events. The core system executes requests, stores, interprets, and processes the states of each task, and optionally handles recovery from faults with compensating transactions.

This analysis of a FSM within the context of service broker-managed asynchronous lifecycle operations brings forth a variety of interesting outcomes. While a multi-behavior FSM lends itself well to the problem statement of controlling long-running transactions, the implementation is non-trivial. A multi-step transactional system coordinated by a FSM requires interaction with a database, support of orchestration-based sagas, and adherence to the HTTP protocol. The FSM may be extended to support retrieval of the status of the machine instance and may be embedded into the core functioning of the service broker runtime.

Figure 12:
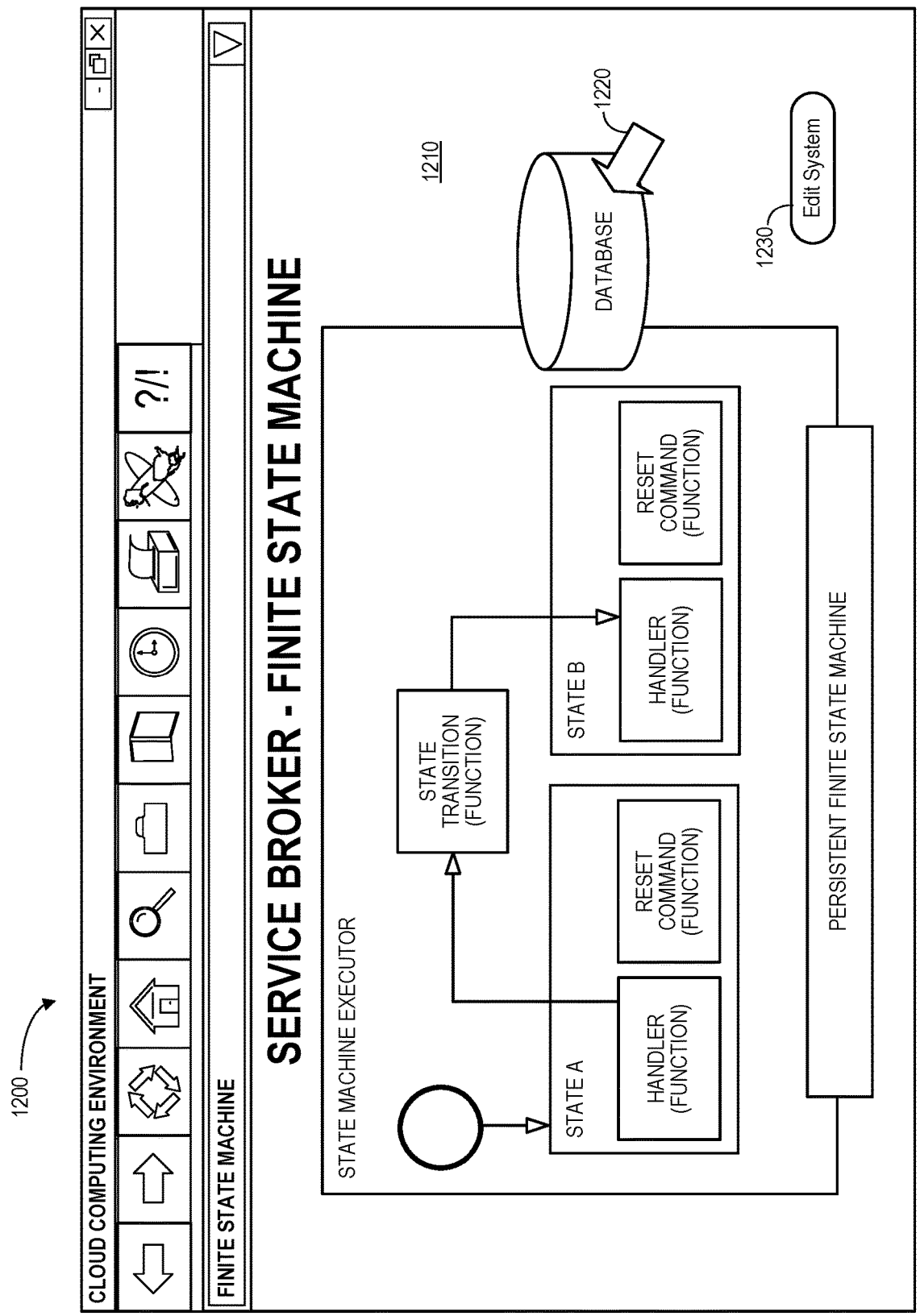
FIG. 12 is a user interface display according to some embodiments.

FIG. 12 is FSM display 1200 according to some embodiments. The display 1200 includes a graphical representation 1210 of the elements of a system in accordance with any of the embodiments described herein. Selection of an element on the display 1200 (e.g., via a touchscreen or a computer pointer 1220) may result in display of a popup window containing more detailed information about that element and/or various options (e.g., to add a data element, modify a mapping, etc.). Selection of an "Edit System" icon 1230 may let an operator or administrator change a database (storage) location, adjust bindings, etc.

Figure 13:
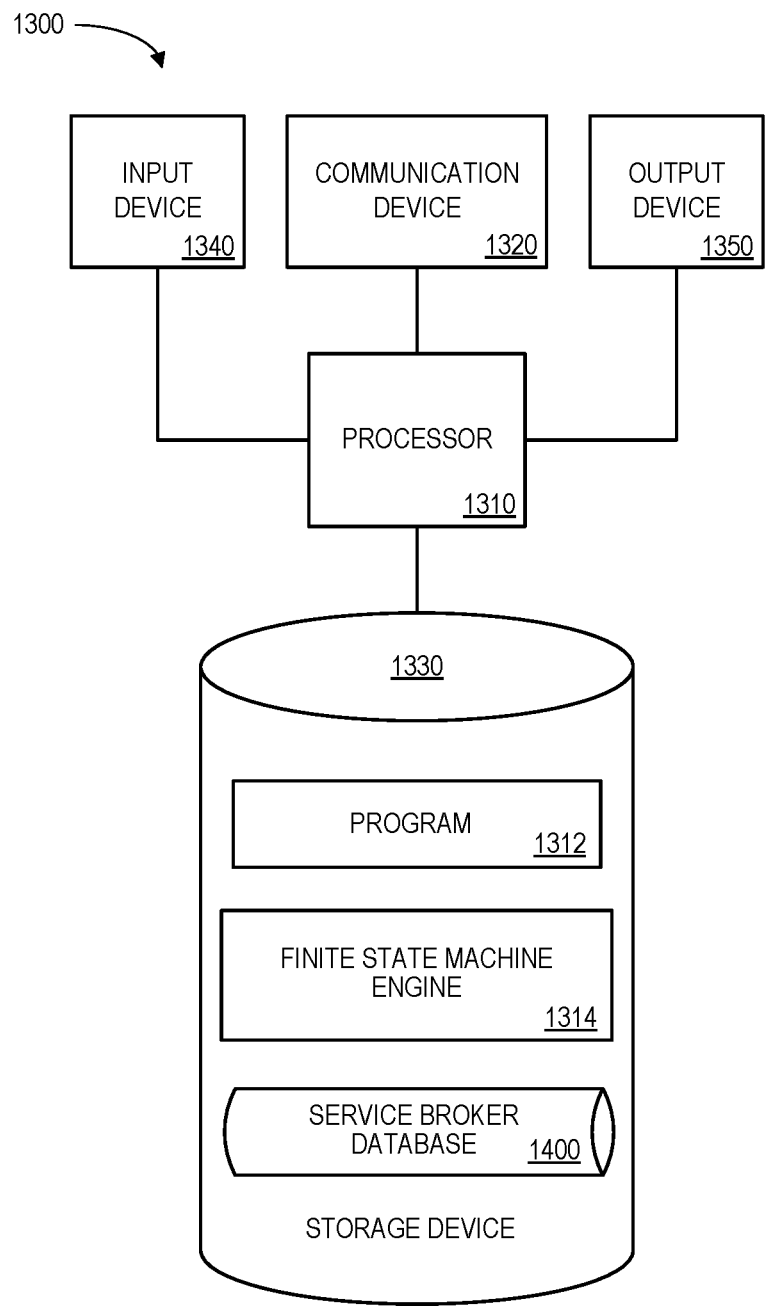
FIG. 13 is an apparatus or platform according to some embodiments.

Note that the embodiments described herein may also be implemented using any number of different hardware configurations. For example, FIG. 13 is a block diagram of an apparatus or platform 1300 that may be, for example, associated with the systems 200, 300 of FIGS. 2, 3 respectively (and/or any other system described herein). The platform 1300 comprises a processor 1310, such as one or more commercially available Central Processing Units ("CPUs") in the form of one-chip microprocessors, coupled to a communication device 1320 configured to communicate via a communication network (not shown in FIG. 13). The communication device 1320 may be used to communicate, for example, with one or more remote user platforms, administrator platforms, etc. The platform 1300 further includes an input device 1340 (e.g., a computer mouse and/or keyboard to input cloud computing information) and/an output device 1350 (e.g., a computer monitor to render a display, transmit alerts and recommendations, and/or create reports about errors, performance parameters, etc.). According to some embodiments, a mobile device, monitoring physical system, and/or PC may be used to exchange information with the platform 1300.

The processor 1310 also communicates with a storage device 1330. The storage device 1330 may comprise any appropriate information storage device, including combinations of magnetic storage devices (e.g., a hard disk drive), optical storage devices, mobile telephones, and/or semiconductor memory devices. The storage device 1330 stores a program 1312 and/or a FSM engine 1314 for controlling the processor 1310. The processor 1310 performs instructions of the programs 1312, 1314, and thereby operates in accordance with any of the embodiments described herein. For example, the processor 1310 may retrieve the current state of a service broker from a database, and (based on the current state) use a persistent FSM to coordinate a distributed transaction workflow for the service broker. The distributed transaction workflow may, for example, include asynchronous instance OSB API lifecycle operations that span multiple entities. The state machine may then update the database with state outputs for the service broker.

The programs 1312, 1314 may be stored in a compressed, uncompiled and/or encrypted format. The programs 1312, 1314 may furthermore include other program elements, such as an operating system, clipboard application, a database management system, and/or device drivers used by the processor 1310 to interface with peripheral devices.

As used herein, information may be "received" by or "transmitted" to, for example: (i) the platform 1300 from another device; or (ii) a software application or module within the platform 1300 from another software application, module, or any other source.

In some embodiments (such as the one shown in FIG. 13), the storage device 1330 further stores a service broker database 1400. An example of a database that may be used in connection with the platform 1300 will now be described in detail with respect to FIG. 14. Note that the database described herein is only one example, and additional and/or different information may be stored therein. Moreover, various databases might be split or combined in accordance with any of the embodiments described herein.

Figure 14:
FIG. 14 is portion of a service broker data store in accordance with some embodiments.

Referring to FIG. 14, a table is shown that represents the service broker database 1400 that may be stored at the platform 1300 according to some embodiments. The table may include, for example, entries associated with an OSB API-compliant service broker. The table may also define fields 1402, 1404, 1406, 1408, 1410 for each of the entries. The fields 1402, 1404, 1406, 1408, 1410 may, according to some embodiments, specify: a service broker identifier 1402, an application identifier 404, an OSB broker identifier 1406, a FSM identifier 1408, and state outputs and timestamp 1410. The service broker database 1400 may be created and updated, for example, when functions are executed, new services are instantiated, etc.

The service broker identifier 1402 might be a unique alphanumeric label that is associated with an OSM API-compliant service broker. The application identifier 1404 might indicate a SaaS associated with a request from a client or user. The OSB broker identifier 1406 might indicate a broker instance that is handling the request. The FSM identifier 1408 might be associated with a state machine executor that coordinates a distributed transaction workflow. The state outputs and timestamp 1410 may include an optional output of a state and act as input to a state transition. State outputs may be represented in arbitrary data formats (although the FSM could narrow the format to a data format such as JSON or YAML to simplify parsing). The timestamp may represent the last operation on the state. Note that the service database 1400 might store information instead of, or in addition to, the information illustrated in FIG. 14, such as a machine identifier, a state identifier, a state name, an invocation identifier, a resource identifier, etc.

Thus, embodiments may facilitate creation of OSB API-compliant functions for a computing environment in a secure, automatic, and efficient manner. Moreover, the use of a FSM may provide benefits such as reproducibility, consistency, operational atomicity, error-handling, reduction in implementation complexity, etc. The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 15:
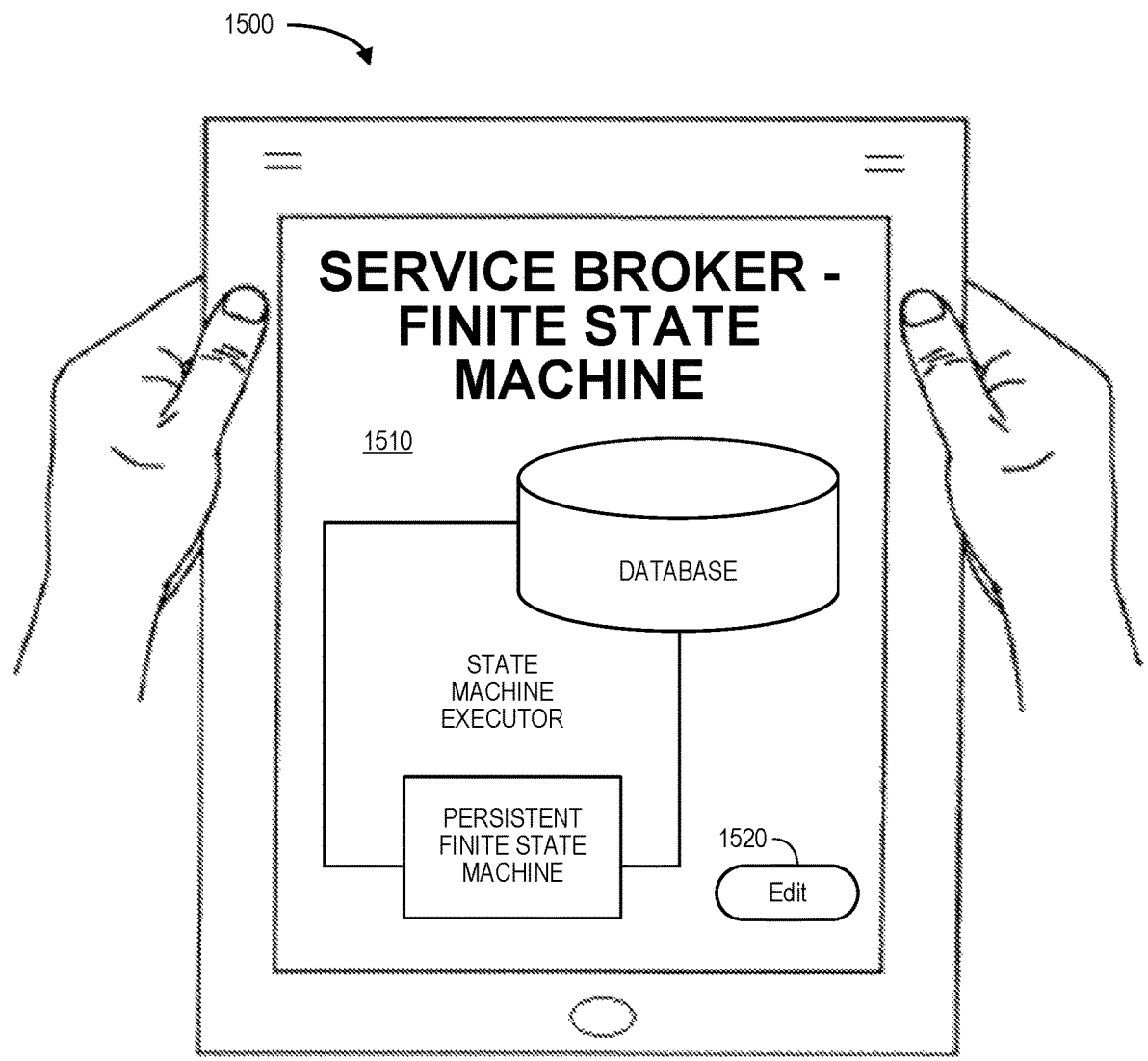
FIG. 15 is a tablet computer rendering a service broker display in accordance with some embodiments.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of serverless functions, any of the embodiments described herein could be applied to other types of serverless functions. Moreover, the displays shown herein are provided only as examples, and any other type of user interface could be implemented. For example, FIG. 15 illustrates a handheld tablet computer 1500 showing a FSM display 1510 according to some embodiments. The FSM display 1510 might include user-selectable data that can be selected and/or modified by a user of the handheld computer 1500 (e.g., via an "Edit" icon 1520) to view updated information about performance metrics, cloud applications, virtual machines, etc.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system associated with an Open Service Broker ("OSB") Application Programming Interface ("API") computing environment, comprising:
   a persistent Finite State Machine ("FSM"), associated with an OSB API service broker, supports storage of in-memory representations of transitions and states in a persistent data structure;
   an FSM library, including: an embedded document parser, logic to encapsulate serial and parallel executions of task functions, and methods or APIs to retrieve execution states;
   a database storing a current state of the service broker; and
   a state machine executor, including:
      a computer processor, and
      computer memory, coupled to the computer processor, storing instructions that, when executed by the computer processor cause the processor to:
         retrieve the current state of the service broker from the database,
         based on the current state, use the persistent FSM and FSM library to coordinate a distributed transaction workflow for the service broker, the distributed transaction workflow including asynchronous instance OSB API lifecycle operations that span multiple entities, and
         update the database with state outputs for the service broker,
   wherein a failure encountered during state or transition execution results in an automatic execution of compensable measures by the persistent FSM and the FSM library to recover from the failure.

2. The system of claim 1, wherein the multiple entities are associated with at least one of: (i) a cloud provider network, and (ii) persistent storage.

3. The system of claim 1, wherein the OSB API service broker is used to provision, manage, and access service instances of a service offering.

4. The system of claim 1, wherein the persistent FSM spans Hyper-Text Transfer Protocol ("HTTP") boundaries and provides at least one of: (i) scalability, (ii) support for serial and parallel task workflows, (iii) support for conditional units of execution, (iv) distributed transaction support, (v) language-agnostic representation of states and transitions, (vi) persistence, and (vii) fault tolerance.

5. The system of claim 1, wherein the OSB API computing environment is associated with at least one of: (i) a cloud infrastructure provider, and (ii) an on-premises deployment.

6. The system of claim 1, wherein the persistent FSM defines a data model including state machine executions fields and state machine master fields.

7. The system of claim 6, wherein the state machine execution fields include at least one of: (i) a machine identifier, (ii) a state identifier, (iii) state name, (iv) an invocation identifier, (v) a resource identifier, (vi) state outputs, and (vii) a timestamp.

8. The system of claim 1, wherein the state machine executor executes a state transition from a first state to a second state, each state including handler and a reset command.

9. The system of claim 1, wherein the FSM library includes an API module, a plugin module for executors, a core orchestration controller, a data translator, and an object-relational mapping module.

10. A computer-implemented method associated with an Open Service Broker ("OSB") Application Programming Interface ("API") computing environment, comprising:
   retrieving, by a computer processor of a state machine executor, a current state of an OSB API service broker from a database;
   based on the current state, using a persistent FSM and a FSM library to coordinate a distributed transaction workflow for the service broker, the distributed transaction workflow including asynchronous instance OSB API lifecycle operations that span multiple entities, wherein the FSM library includes: an embedded document parser, logic to encapsulate serial and parallel executions of task functions, and methods or APIs to retrieve execution states; and
   updating the database with state outputs for the service broker,
   wherein a failure encountered during state or transition execution results in an automatic execution of compensable measures by the persistent FSM and the FSM library to recover from the failure.

11. The method of claim 10, wherein the multiple entities are associated with at least one of: (i) a cloud provider network, and (ii) persistent storage.

12. The method of claim 10, wherein the OSB API service broker is used to provision, manage, and access service instances of a service offering.

13. The method of claim 10, wherein the persistent FSM spans Hyper-Text Transfer Protocol ("HTTP") boundaries and provides at least one of: (i) scalability, (ii) support for serial and parallel task workflows, (iii) support for conditional units of execution, (iv) distributed transaction support, (v) language-agnostic representation of states and transitions, (vi) persistence, and (vii) fault tolerance.

14. The method of claim 10, wherein the OSB API computing environment is associated with at least one of: (i) a cloud infrastructure provider, and (ii) an on-premises deployment.

15. A non-transitory, computer readable medium having executable instructions stored therein that, when executed by a computer processor cause the processor to perform a method associated with an Open Service Broker ("OSB") Application Programming Interface ("API") computing environment, the method comprising:
   retrieving, by a computer processor of a state machine executor, a current state of an OSB API service broker from a database;
   based on the current state, using a persistent FSM and a FSM library to coordinate a distributed transaction workflow for the service broker, the distributed transaction workflow including asynchronous instance OSB API lifecycle operations that span multiple entities, wherein the FSM library includes: an embedded document parser, logic to encapsulate serial and parallel executions of task functions, and methods or APIs to retrieve execution states; and
   updating the database with state outputs for the service broker,
   wherein a failure encountered during state or transition execution results in an automatic execution of compensable measures by the persistent FSM and the FSM library to recover from the failure.

16. The medium of claim 15, wherein the persistent FSM defines a data model including state machine executions fields and state machine master fields.

17. The medium of claim 16, wherein the state machine execution fields include at least one of: (i) a machine identifier, (ii) a state identifier, (iii) state name, (iv) an invocation identifier, (v) a resource identifier, (vi) state outputs, and (vii) a timestamp.

18. The medium of claim 15, wherein the state machine executor executes a state transition from a first state to a second state, each state including handler and a reset command.

19. The medium of claim 15, wherein the FSM library includes an API module, a plugin module for executors, a core orchestration controller, a data translator, and an object-relational mapping module.

20. The medium of claim 15, wherein the OSB API computing environment is associated with at least one of: (i) a cloud infrastructure provider, and (ii) an on-premises deployment.

* * * * *